US011719187B2

(12) United States Patent
Bonin

(10) Patent No.: US 11,719,187 B2
(45) Date of Patent: *Aug. 8, 2023

(54) AIR-FUEL SYSTEM FOR A CIRCULATING PISTON ENGINE

(71) Applicant: WB Development Company, LLC, Marlborough, MA (US)

(72) Inventor: Walter T. Bonin, Marlborough, MA (US)

(73) Assignee: WB Development Company, LLC, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,028

(22) Filed: Jun. 3, 2022

(65) Prior Publication Data
US 2022/0290629 A1 Sep. 15, 2022

Related U.S. Application Data

(63) Continuation of application No. 16/671,854, filed on Nov. 1, 2019, now Pat. No. 11,352,977.
(Continued)

(51) Int. Cl.
*F02F 11/00* (2006.01)
*F02B 23/00* (2006.01)
(Continued)

(52) U.S. Cl.
CPC .............. *F02F 11/007* (2013.01); *F01C 1/07* (2013.01); *F01C 19/08* (2013.01); *F02B 23/00* (2013.01);
(Continued)

(58) Field of Classification Search
CPC ... F02F 5/00; F02F 11/007; F01C 1/07; F01C 19/08; F02B 23/00; F02B 53/06; F02B 55/02; F15B 15/125
See application file for complete search history.

(56) References Cited

U.S. PATENT DOCUMENTS 1,106,882 A * 8/1914 Mathieson .............. F01C 19/04
418/196
4,086,881 A * 5/1978 Rutten .................... F01C 11/00
418/188
(Continued)

FOREIGN PATENT DOCUMENTS

CN    1299000       6/2001
EP    2808484 A1   12/2014
(Continued)

OTHER PUBLICATIONS

Extended European Search Report dated Jul. 25, 2022 from corresponding EPO Application No. 19877813.6.

*Primary Examiner* — Audrey B. Walter
(74) *Attorney, Agent, or Firm* — Duquette Law Group, LLC

(57) ABSTRACT

An engine includes a housing and a combustion assembly. The combustion assembly includes an annular bore and a combustion piston assembly disposed within the annular bore. The combustion piston assembly includes a set of pistons, a first sealing ring connected to each piston and a second sealing ring connected to each piston. The second sealing ring is configured to provide selective access between the annular bore and at least one fluid conduit carried by the engine. The engine includes at least one valve configured to move between a first position within the annular bore to allow the combustion piston assembly to travel within the annular bore from a first location proximate to the at least one valve to a second location distal to the at least one valve and a second position within the annular bore to define a combustion chamber.

22 Claims, 14 Drawing Sheets

Related U.S. Application Data

(60) Provisional application No. 62/754,186, filed on Nov. 1, 2018.

(51) Int. Cl.
| | | |
|---|---|---|
| *F01C 1/07* | (2006.01) | |
| *F15B 15/12* | (2006.01) | |
| *F02F 5/00* | (2006.01) | |
| *F01C 19/08* | (2006.01) | |
| *F02B 53/06* | (2006.01) | |
| *F02B 55/02* | (2006.01) | |

(52) U.S. Cl.
CPC .............. *F02B 53/06* (2013.01); *F02B 55/02* (2013.01); *F02F 5/00* (2013.01); *F15B 15/125* (2013.01)

(56) References Cited

U.S. PATENT DOCUMENTS

| | | | |
|---|---|---|---|
| 8,936,004 B1 * | 1/2015 | Buchanan | F04C 15/06 |
| | | | 123/240 |
| 9,850,759 B2 | 12/2017 | Bonin et al. | |
| 10,260,346 B2 | 4/2019 | Bonin | |

FOREIGN PATENT DOCUMENTS

| | | |
|---|---|---|
| JP | 50-066609 | 1/1975 |
| JP | 63-227901 | 9/1988 |
| JP | 2003-336526 | 11/2003 |
| JP | 2010-501778 | 1/2010 |
| JP | 2015-117707 | 6/2015 |
| WO | 2010095225 | 8/2012 |

* cited by examiner

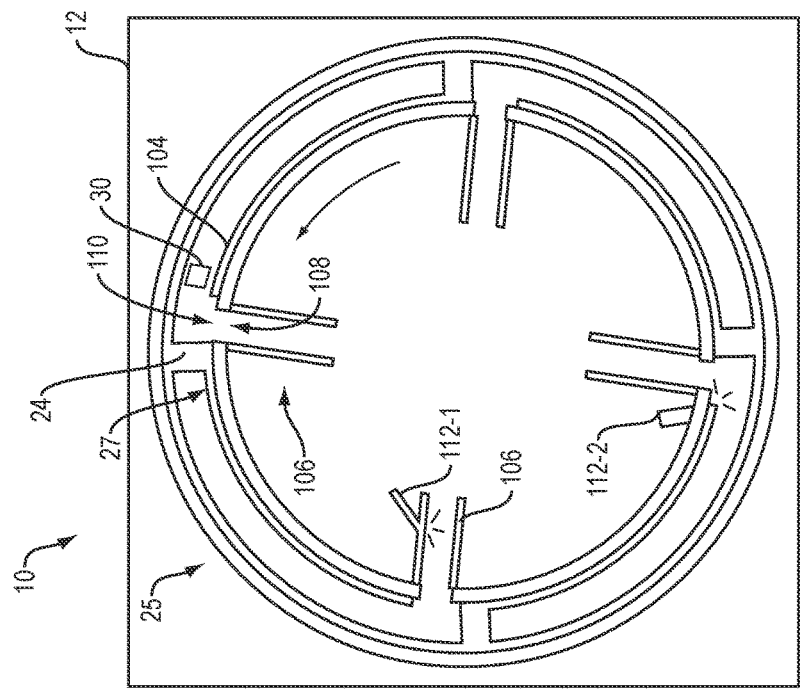
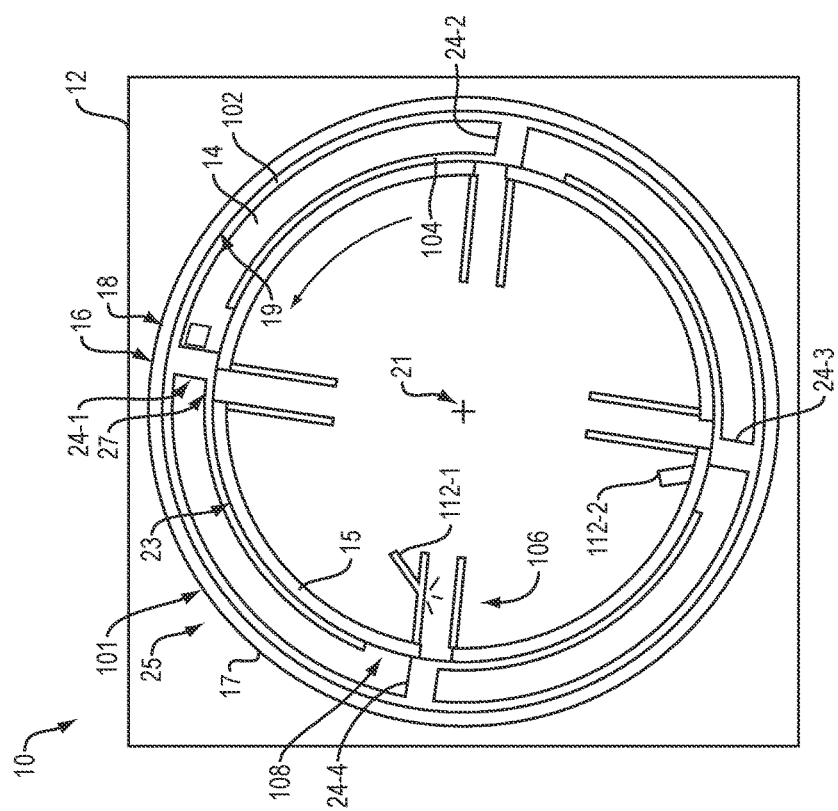
FIG. 1A
FIG. 1B

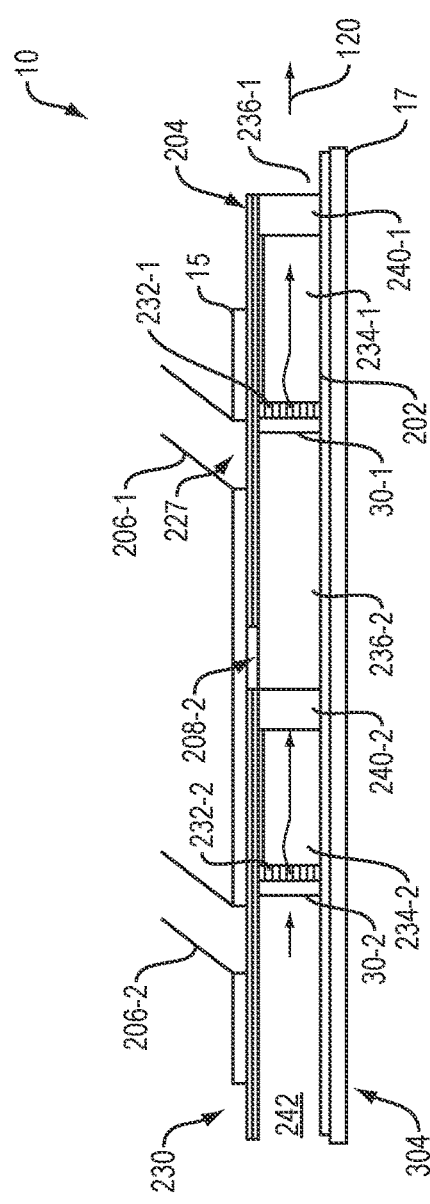
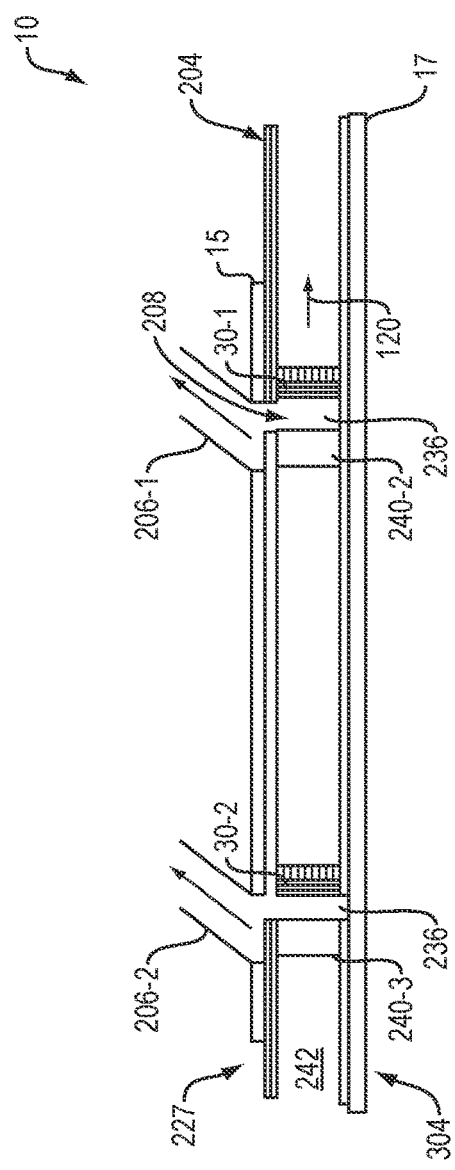
FIG. 10
FIG. 11

AIR-FUEL SYSTEM FOR A CIRCULATING PISTON ENGINE

RELATED APPLICATIONS

This patent application is a continuation of U.S. Utility application Ser. No. 16/671,854, filed on Nov. 1, 2019, entitled "Air-Fuel System for a Circulating Piston Engine," which claims the benefit of U.S. Provisional Application No. 62/754,186, filed on Nov. 1, 2018, entitled, "Air-Fuel System for a Circulating Piston Engine," the contents and teachings of which are hereby incorporated by reference in their entirety.

BACKGROUND

Conventional piston engines include multiple cylinder assemblies used to drive a crankshaft. In order to drive the crankshaft, each cylinder assembly requires fuel, such as provided by a fuel pump via a fuel injector. During operation, a spark plug of each cylinder assembly ignites a fuel/air mixture received from the fuel injector and causes the mixture to expand. Expansion of the ignited mixture displaces a piston of the cylinder assembly within a cylinder assembly housing to rotate the crankshaft.

SUMMARY

By contrast to conventional piston engines, embodiments of the present innovation relate to an air-fuel system for a circulating piston engine. In one arrangement, the circulating piston engine includes a combustion piston assembly which is configured to manage the air pressure entering the engine during the combustion process. For example, the combustion piston assembly includes a set of pistons disposed within an annular bore defined by a housing of the engine.

The combustion piston assembly can further include first and second sealing rings. The first sealing ring is configured to mitigate blowby of combustion gasses relative to a piston following a combustion within a combustion chamber formed between the piston and an associated valve. The second sealing ring is configured to provide selective access between the annular bore and one or more fluid conduits, such as relatively high pressure air conduits, carried by the engine. For example, the second sealing ring can define a number of openings that, when misaligned relative to the fluid conduits, isolate the fluid conduits from the annular bore, thereby mitigating the flow of air between the fluid conduits and the annular bore. When aligned with the fluid conduits, the openings allow the flow of air between the fluid conduits and the annular bore.

In one embodiment, an engine includes a housing and a combustion assembly carried by the housing. The combustion assembly includes an annular bore defined by the engine and a combustion piston assembly disposed within the annular bore. The combustion piston assembly includes a set of pistons, a first sealing ring connected to each piston of the combustion piston assembly and a second sealing ring connected to each piston of the combustion piston assembly. The second sealing ring is configured to provide selective access between the annular bore and at least one fluid conduit carried by the engine. The engine includes at least one valve configured to move between a first position within the annular bore to allow the combustion piston assembly to travel within the annular bore from a first location proximate to the at least one valve to a second location distal to the at least one valve and a second position within the annular bore to define a combustion chamber relative to the combustion piston assembly at the second location.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 1A illustrates an overhead, cross-sectional, schematic view of a circulating piston engine, according to one arrangement.

FIG. 1B illustrates the overhead, cross-sectional, schematic view of the circulating piston engine of FIG. 1A where openings of a sealing ring are aligned with the engine's fluid conduits.

FIG. 10 illustrates a sectional, schematic view of a portion the circulating piston engine of FIG. 9 having a compression assembly disposed in a first position relative to the engine's fluid conduits, according to one arrangement.

FIG. 11 illustrates the sectional, schematic view of the portion the circulating piston engine of FIG. 10 having the compression assembly disposed in a second position relative to the engine's fluid conduits, according to one arrangement.

DETAILED DESCRIPTION

Figure 1C:
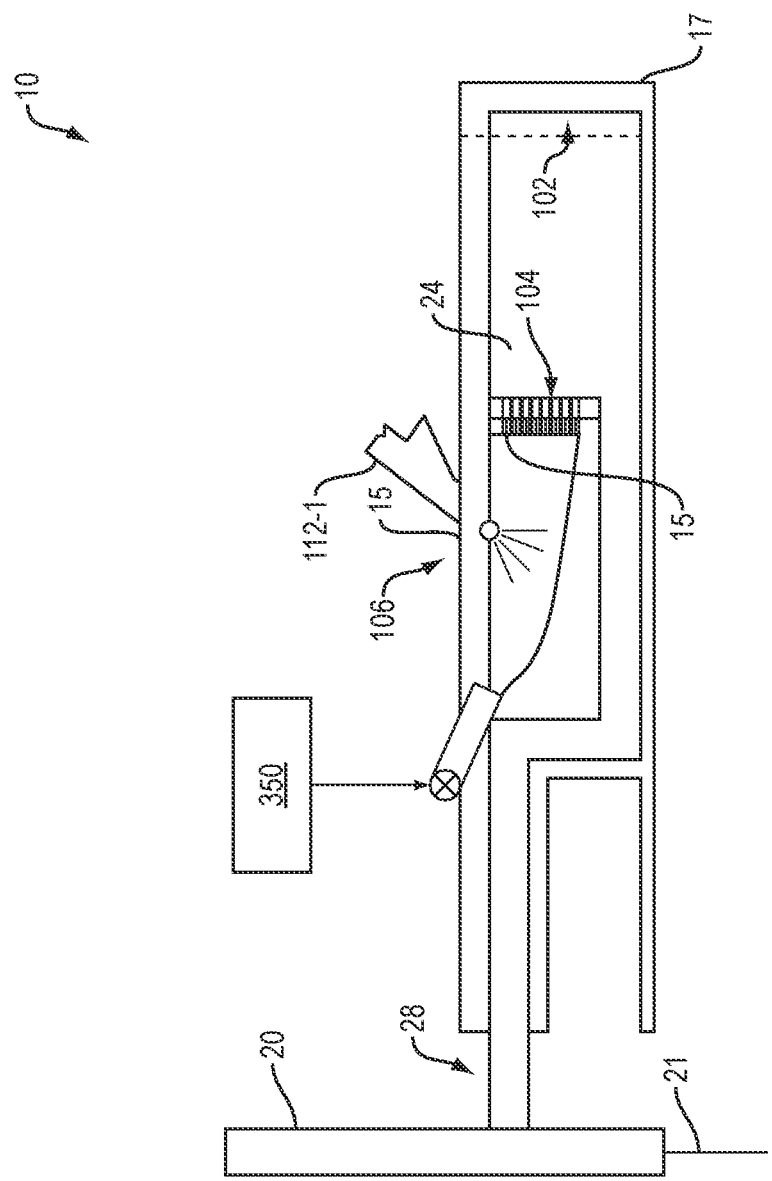
FIG. 1C illustrates a side-sectional, schematic view of the circulating piston engine of FIG. 1B, according to one arrangement.

The circulating piston engine includes a combustion piston assembly which is configured to manage the air pressure entering the engine during the combustion process. For example, the combustion piston assembly includes a set of pistons disposed within an annular bore defined by a housing of the engine. The combustion piston assembly can further include first and second sealing rings. The first sealing ring is configured to mitigate blowby of combustion gasses relative to a piston following a combustion within a combustion chamber formed between the piston and an associated valve. The second sealing ring is configured to provide selective access between the annular bore and one or more fluid conduits, such as relatively high pressure air conduits, carried by the engine. For example, the second sealing ring can define a number of openings that, when misaligned relative to the fluid conduits, isolate the fluid conduits from the annular bore, thereby mitigating the flow of air between the fluid conduits and the annular bore and that, when aligned with the fluid conduits, allow the flow of air between the fluid conduits and the annular bore.

FIGS. 1A and 1B illustrates a schematic view of a circulating piston engine 10, according to one arrangement. The engine 10 includes a housing 12 having a combustion assembly 25 that includes an annular channel or bore 14 defined by the engine between first and second housing walls 15, 17. The engine 10 further includes a combustion piston assembly 16 and a valve assembly 18.

The annular bore 14 is disposed at an outer periphery of the housing 12. While the annular bore 14 can be configured in a variety of sizes, in one arrangement, the annular bore 14 is configured as having a radius of about twelve inches relative to an axis of rotation 21 of the combustion piston assembly 16. With such a configuration, the relatively large radius of the annular bore 14 disposes the engine combustion chamber at a maximal distance from the axis of rotation 21 and allows the combustion piston assembly 16 to generate a relatively large torque on an associated drive mechanism, such as a drive shaft 20, disposed at the axis of rotation 21 and coupled to the combustion piston assembly 16.

The annular bore 14 can be configured with a cross-sectional area having a variety of shapes. For example, in the case where a piston 24 of the combustion piston assembly 16 defines a generally rectangular cross-sectional area, the annular bore 14 can also define a corresponding rectangular cross-sectional area. In such an arrangement, the cross-sectional area of the annular bore 14 is larger than the cross sectional area of the piston 24 to allow the piston 24 to travel within the annular bore 14 during operation.

The combustion piston assembly 16 can include any number of individual pistons 24 disposed within the annular bore 14. For example, in the arrangement illustrated, the combustion piston assembly 16 includes four pistons 24-1 through 24-4 disposed within the annular bore 14 about the periphery of an extension portion 28 which couples the pistons 24 to a drive shaft 20. While the pistons 24 can be disposed at a variety of locations about the periphery of the extension portion 28, in one arrangement, opposing pistons are disposed at an angular orientation of about 180° relative to each other and adjacent pistons disposed at an angular orientation of about 90° relative to each other. For example, as illustrated, the first and third pistons 24-1, 24-3 are disposed at about 180° relative to each other and the second and fourth pistons 24-2, 24-4 are disposed at about 180° relative to each other. Additionally, the first and second pistons 24-1, 24-2 are disposed at a relative angular orientation of about 90°, the second and third pistons 24-2, 24-3 are disposed at a relative angular orientation of about 90°, the third and fourth pistons 24-3, 24-4 are disposed at a relative angular orientation of about 90°, and the fourth and first pistons 24-4, 24-1 are disposed at a relative angular orientation of about 90°.

During operation, the pistons 24 of the combustion piston assembly 16 are configured to rotate within the annular bore 14 either in a clockwise or counterclockwise direction. Such rotation causes rotation of the associated drive mechanism.

With continued reference to FIGS. 1A and 1B, each of the pistons 24 travels within the bore 14 along a relatively large stroke distance, such as a distance of between about 16 inches and 20 inches, toward a subsequent valve assembly 18. In one arrangement, at a certain point in the bore 14, such as at the end of a stroke length, each piston 24 passes a corresponding exhaust port, such as disposed proximal to the subsequent valve assembly 18, which vents the spent gas contained in the chamber 110 to the atmosphere. For example, as piston 24-1 passes the exhaust port, spent gas contained in the chamber 110 between the piston 24-1 and the rotary valve 30-1 can exit the chamber 26-1 via the exhaust port.

The combustion piston assembly 16 also includes a seal assembly 101 having a first or outer sealing ring 102 and a second or inner sealing ring 104.

As indicated in FIGS. 1A and 1B, the first sealing ring 102 is configured to mitigate blowby of combustion gasses relative to a piston 24 following a combustion within a combustion chamber 110 formed between the piston 24 and an associated valve of the valve assembly 18. In one arrangement, the first sealing ring 102 extends about an outer periphery of the pistons 24 and is coupled to each piston 24 of the combustion piston assembly 16. For example, the first sealing ring 102 is coupled to an outer face of each piston 24 and is disposed between the outer face of each piston 24 and an inner portion 19 of the second wall 17 of the housing 12 to define a vertical clearance space there between. Further, the first sealing ring 102 and each piston 24 defines lateral clearance spaces between a ceiling wall and a floor of the annular bore 14, respectively. While the vertical and lateral clearance spaces can have a variety of dimensions, in one arrangement, each clearance space defines a length of between about 0.001 and 0.0015 inches. Further, in one arrangement, the vertical and lateral clearance spaces can include a lubricant, such as a lubricating fluid including air or oil, to minimize direct contact between the first sealing ring 102 and the inner wall 19, the ceiling wall, and the floor of the annular bore 14 of the housing 12.

Figure 4:
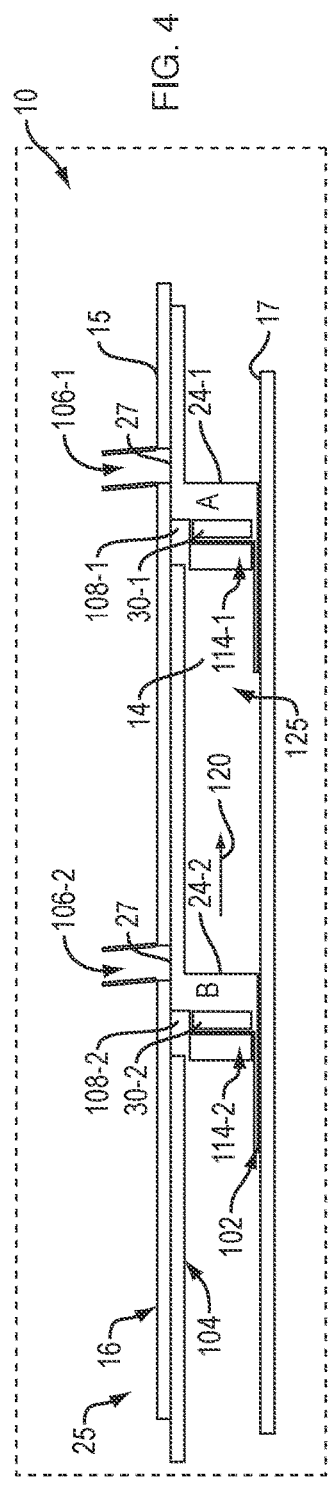
FIG. 4 illustrates a sectional, schematic view of a portion the circulating piston engine of FIG. 1A having a combustion piston assembly disposed in a first position relative to the engine's fluid conduits, according to one arrangement.
Figure 5:
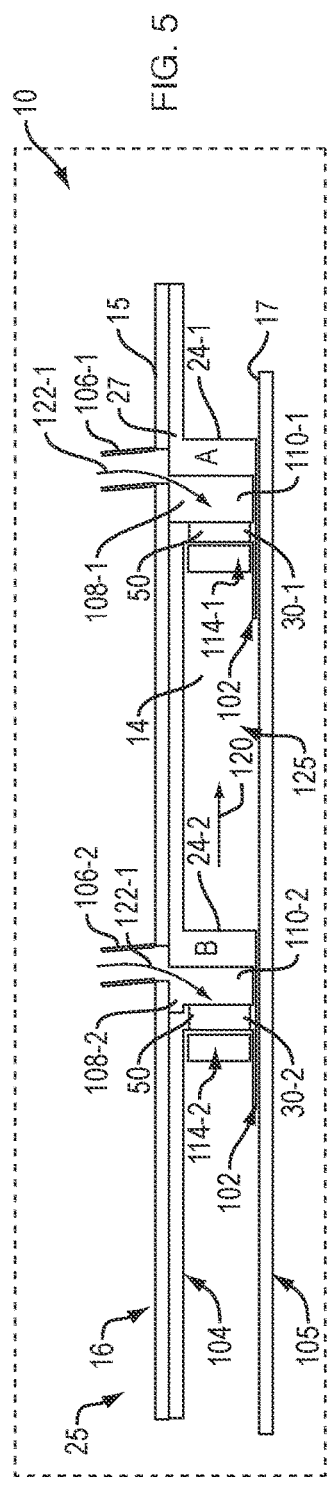
FIG. 5 illustrates the sectional, schematic view of the portion the circulating piston engine of FIG. 4 having the combustion piston assembly disposed in a second position relative to the engine's fluid conduits, according to one arrangement.
Figure 6:
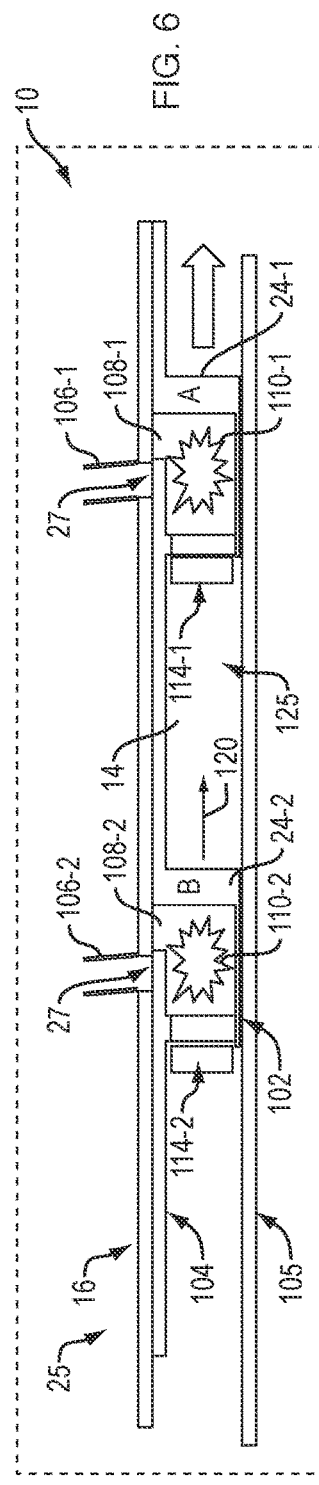
FIG. 6 illustrates the sectional, schematic view of the portion the circulating piston engine of FIG. 4 having the combustion piston assembly disposed in a third position relative to the engine's fluid conduits, according to one arrangement.

As provided in FIGS. 1A and 1B, the first sealing ring 102 can be configured as a continuously walled structure disposed in proximity to the second wall 17 of the housing 12. In one arrangement, as shown in FIGS. 4-6, the first sealing ring 102 can define a set of openings 125 disposed about the circumference of the wall structure. These openings 125 are configured to allow weld joints or zones associated with the rotary valves 30 to rotate within the annular bore 14 while mitigating interference with the first sealing ring 102.

For example, with reference to FIG. 3D and as will be described below, each rotary valve 24 can include a valve housing, such as a faceplate, and a wall structure disposed at the outer periphery of the faceplate. A manufacturer can weld opposing ends of the wall structure together to create a weld joint 31. However, rotation of the weld joint 31 into the housing 12 can potentially interfere with the rotation of the combustion piston assembly 16. Positioning of the openings 125 about the circumference of the first sealing ring 102 allows the rotary valves 30 and associated weld joints to rotate through the housing 12 while mitigating interference with the combustion piston assembly 16.

The second sealing ring 104 is configured to provide selective access between the annular bore 14 and one or more fluid conduits 106 carried by the engine 10. For example, the second sealing ring 104 is coupled to an inner face of each piston 24 and is disposed between the inner face of each piston 24 and an inner portion 23 of the first wall 15 of the housing 12 to define a vertical clearance space there between. While the vertical clearance space can have a variety of dimensions, in one arrangement, the vertical clearance space defines a length of between about 0.001 and 0.0015 inches. Further, in one arrangement, the vertical clearance space can include a lubricant, such as a lubricating fluid including air or oil, to minimize direct contact between the second sealing ring 104 and the inner portion 23 of the first wall 15.

The second sealing ring 104 defines a set of openings 108 where each opening 108 is disposed in proximity to a piston 24 of the combustion piston assembly 16. The combustion piston assembly 16 is configured to position the second sealing ring 104 between a first position to align a wall portion 27 of the second sealing ring 104 with a corresponding fluid conduit 106 and a second position to align the opening 108 of the second sealing ring 104 with the at least one fluid conduit 106.

In the case where the openings 108 of the second sealing ring 104 are unaligned with the fluid conduits 106 and a wall portion 27 is disposed over the fluid conduits 106, the second sealing ring 104 mitigates the flow of fluid, such as relatively high pressure air provided by a pressurized air reservoir 350 as illustrated in FIG. 1C, or an air and fuel mixture, from the fluid conduits 106 into a combustion chamber 110 defined within the annular bore 14. However, as the combustion piston assembly 16 rotates the sealing ring 104 and pistons 24, such as in a counterclockwise direction as indicated, the combustion piston assembly 16 can align the openings 108 of the second sealing ring 104 with the fluid conduits 106, as illustrated in FIGS. 1B and 1C. With such positioning, the combustion piston assembly 16 defines a combustion chamber 110 as the annular bore space between the piston 24 and a rotary valve 30 of the rotary valve assembly 18. Further, this positioning can allows the exchange of relatively high pressure air with the combustion chamber 110 via the fluid conduits 106 and/or can facilitate the flow of a relatively high pressure air-fuel mixture into the combustion chamber 110.

For example, as shown in FIG. 1A through 1C, a fuel injector 112-1 can be coupled to a corresponding fluid conduit 106. During operation, the fluid conduit 106 can receive fuel from the fuel injector 112-1 and relatively high pressure air from an air source 350. The turbulence created by the substantially simultaneous introduction of the fuel and air can cause the fuel and air to become mixed within the fluid conduit 106 prior to combustion such that the fluid conduit 106 provides the combination as an air-fuel mixture to the combustion chamber 110.

In another example, as illustrated in FIGS. 1A and 1B, a fuel injector 112-2 can be coupled to the engine 10, such as the first engine wall 15, in proximity to the fluid conduit 106. During operation, the fuel injector 112-2 and the fluid conduit 106 provide fuel and relatively high pressure air, respectively, to the combustion chamber 110. The turbulence created by the substantially simultaneous introduction of the fuel and air can cause the fuel and air to become mixed within the combustion chamber 110 prior to combustion.

As indicated above, the fluid conduits 106 can be disposed in fluid communication with a high-pressure air source 350. In one arrangement, the high-pressure air source can be an air reservoir 350 which is configured to store a volume of relatively high pressure air (e.g., between about 200-225 psi) which can be replenished during operation. While the high-pressure air source 350 can contain air at a variety of pressures, in one arrangement, the high-pressure air source 350 can contain air at a pressure greater than about 120 psi and can contain air at a pressure greater than about 175 psi. With the receipt of relatively high pressure air to the fluid conduit 106 or combustion chamber 110, the engine 10 can provide relatively faster combustion of the fuel-air mixture which leads to a relatively higher operational efficiency of the engine 10.

As provided above, the first and second sealing rings 102, 104 are coupled to each piston 24 and are configured to rotate with the pistons 24 during operation as the combustion piston assembly 16 rotates within the engine 10. The first and second sealing rings 102, 104 can be connected to the pistons 24 in a variety of ways. For example, the first and second sealing rings 102, 104 can be coupled to each piston 24 of the combustion piston assembly 16 using fasteners. In another example, the first and second sealing rings 102, 104 can be welded to each piston 24 or can form a friction fit connection with each piston 24. With the first and second sealing rings 102, 104 being coupled to each piston 24 of the combustion piston assembly 16, the sealing rings 102, 104 provide lateral and vertical stability to the pistons 24, thereby minimizing the generation of bending forces on each piston 24 as caused by piston loading following combustion.

The first and second sealing rings 102, 104 can be manufactured from a variety of materials. In one arrangement, the sealing rings 102, 104 can be manufactured from a material having a coefficient of thermal expansion that is substantially equal to the coefficient of thermal expansion of the material that forms the combustion piston assembly 16. As such, during operation, as the temperature of the engine 10 changes, the first and second sealing rings 102, 104 can expand or contract at substantially the same rate as the pistons 24 of the combustion piston assembly 16.

The valve assembly 18 can be configured in a variety of ways. In one embodiment, the valve assembly 18 includes a set of rotary valves 30, each rotary valve 30 configured to define a combustion chamber 110 relative to the respective pistons 24 of the combustion piston assembly 16.

Figure 2:
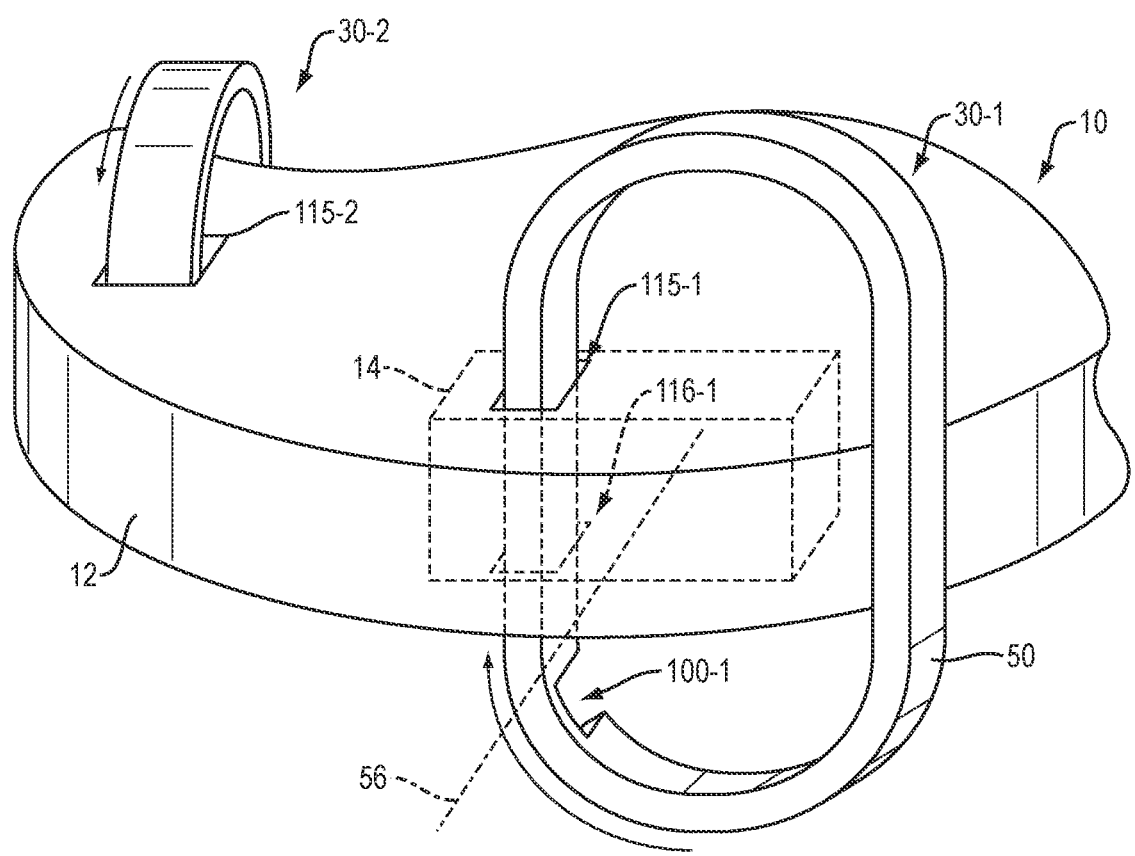
FIG. 2 illustrates a partial perspective view of a schematic representation of a set of rotary valves and circulating piston engine of FIG. 1A, according to one arrangement.

For example, with additional reference to FIG. 2, each rotary valve 30 is configured to rotate about an axis of rotation 56 that is substantially perpendicular to the axis of rotation 21 of the pistons 24. Rotation of each rotary valve 30 relative to the housing 12 and the annular bore 14 creates a temporary combustion chamber 110 relative to a corresponding piston 24. For example, as indicated in FIG. 2, the housing 12 defines opposing openings 115, 116 relative to the annular bore 14 through which the rotary valves 30 extend. Specifically, with reference to the first rotary valve 30-1 of FIG. 2, the housing 12 defines a first opening 115-1 through a first or upper surface and an opposing second opening 116-1 through a second or lower surface. The first rotary valve 30-1 extends though the first opening 115-1, into the annular bore 14, and through the second opening 116-1. With such a configuration, a portion of each rotary valve 30 is rotatably disposed within the annular bore 14 during operation of the engine 10.

Figure 3A:
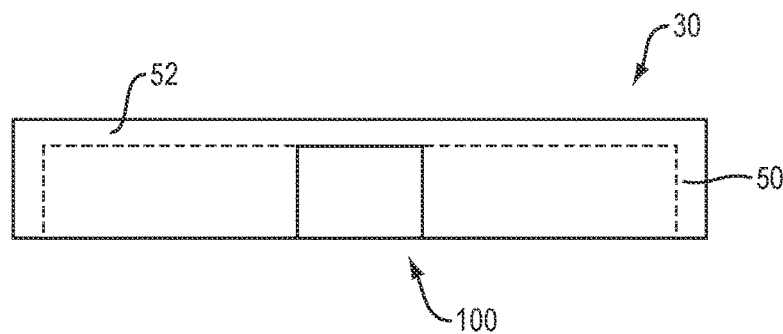
FIG. 3A illustrates a side schematic view of a rotary valve, according to one arrangement.
Figure 3B:
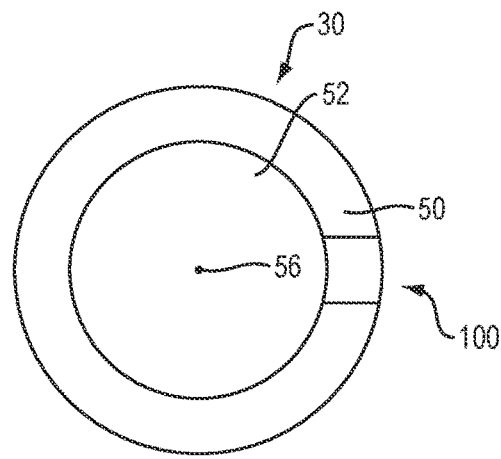
FIG. 3B illustrates a bottom schematic view of the rotary valve of FIG. 1B, according to one arrangement.
Figure 3C:
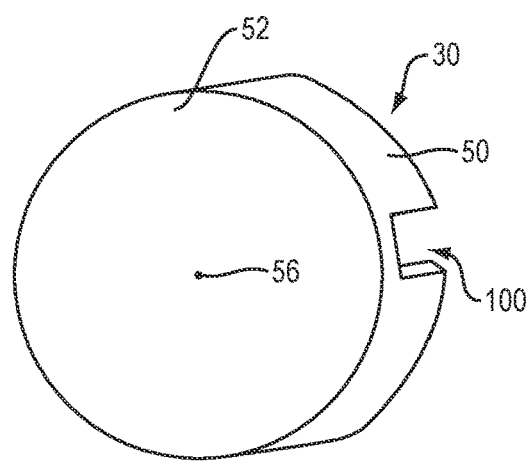
FIG. 3C illustrates a top perspective schematic view of the rotary valve of FIG. 1B, according to one arrangement.
Figure 3D:
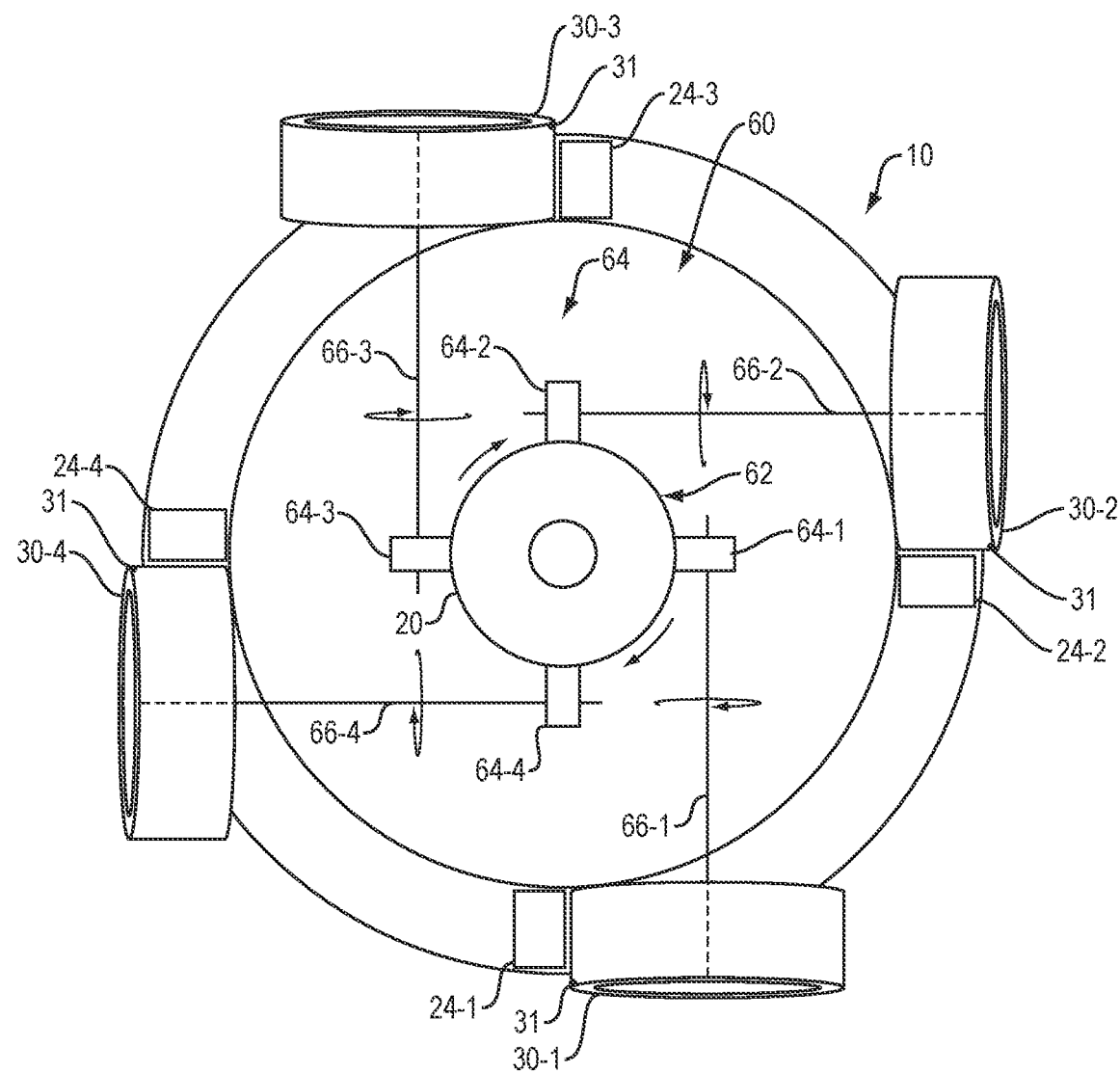
FIG. 3D illustrates a bottom sectional schematic view of a rotary drive mechanism of a rotary valve assembly.

As illustrated in FIGS. 3A through 3C, each rotary valve 30 of the rotary valve assembly 18 is manufactured as a substantially circular, cup-shaped structure. For example, each rotary valve 30 can include a faceplate 52, such as a circular faceplate, and a wall structure 50, such as a loop-shaped wall structure, disposed at the outer periphery of the faceplate 52. The loop-shaped wall structure 50 of the rotary valve 30 defines an opening or slot 100 configured to allow each of the pistons 24 to rotate within the annular bore 14 when the slot 100 is aligned with a piston 24 travelling in the annular bore 14.

In use, the valve assembly 18 can rotate each rotary valve 30 such that the loop-shaped wall structure 50 forms a bulkhead with a piston 24 for the majority of a piston rotation cycle and defines a combustion chamber relative to the piston 24. The rotation of the rotary valve 30 is timed such that each slot 100 defined by each rotary valve 30 is temporarily aligned with the annular bore 14 to allow a piston 24 to travel within the annular bore 14 from a first location proximate to the rotary valve 30 to a second location distal to the rotary valve 30.

The pistons 24 and rotary valve assembly 18 are disposed at the outer perimeter of the engine housing 12, such as at distance of about twelve inches from a drive mechanism 20. In use with the combustion force applied to the pistons 24 along a direction that is tangent to the direction of rotation and perpendicular to the distance from the drive mechanism 20, such combustion force can maximize torque on the drive mechanism 20. Additionally, the relatively long stroke path of the pistons 24, the presence of exhaust ports, and the ability of the engine 10 to customize the number of combustion events generated in the bore 14 can enhance the performance of the engine 10. For example, the engine 10 can produce a relatively large amount of continuous power (e.g., a horsepower of about 685 @800 RPM) with a relatively high torque (e.g., an average torque of about 4500 ft-lbs) and efficiency (e.g., an efficiency of about 60%) relative to conventional engines having an efficiency of about 25-30%.

While each rotary valve 30 can be manufactured from a variety of materials, in one arrangement, the rotary valves 30 are manufactured from one or more materials capable of withstanding combustion temperatures in excess of about 4000° F. and pressures of about 1000 pounds per square inch (psi) while rotating relative to the housing 12.

Figure 3E:
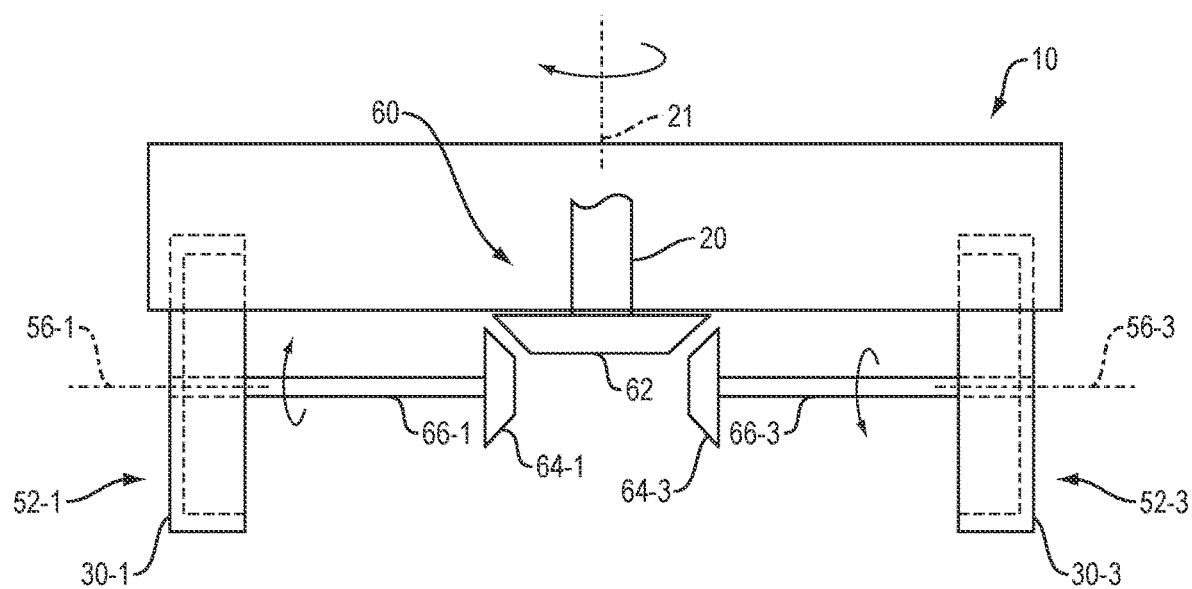
FIG. 3E illustrates a side schematic view of the rotary drive mechanism of FIG. 3D, according to one arrangement.

A variety of types of rotary drive mechanisms can be utilized to rotate each rotary valve 30 within the annular bore 14. For example, FIGS. 3D and 3E illustrate, respectively, a bottom sectional and side schematic view of a rotary drive mechanism 60 of the rotary valve assembly 18. The rotary drive mechanism 60 can include a drive gear 62 connected to the drive mechanism 20. The rotary drive mechanism 60 can also include a set of rotary valve gears 64 disposed in operative communication with the drive gear 62 and with the rotary valves 30. For example, the set of rotary valve gears 64 can include first, second, third, and fourth rotary valve gears 66-1, 66-2, 66-3, and 66-4, respectively, mesh with the rotary drive mechanism 60. While the drive gear 62 and the set of rotary valve gears 64 can be configured in a variety of ways, in one arrangement, the drive gear 62 and each of the rotary valve gears 64 are configured as bevel gears.

Each of the rotary valve gears 64-1 through 64-4 are also connected to corresponding first, second, third, and fourth rotary valves 30-1, 30-2, 30-3, and 30-4, via respective shafts 66-1, 66-2, 66-3, and 66-4. For example, each shaft 66 extends into the loop-shaped wall structure 50 of a corresponding rotary valve 30 and connects to that rotary valve's face plate 52 such that a longitudinal axis of the shaft is substantially collinear with the axis of rotation 56 of the rotary valve 30.

With such a configuration, as the drive mechanism 20 and drive gear 62 rotate, each of the corresponding rotary valve gears 64, shafts 66, and rotary valves 30 rotate as well. For example, rotation of the drive mechanism 20 and drive gear 62 in a clockwise direction about the axis of rotation 21 causes the rotary valve gears 66-1 through 66-4, shafts 66-1 through 66-4, and rotary valves 30-1 through 30-4 to rotate about their respective axes of rotation 52-1 through 52-4. As such, the rotary drive mechanism 60 can rotate each rotary valve 30 between a first position to align an opening 100 of the wall structure 50 with the annular bore 14 to allow the piston 24 of the combustion piston assembly 16 to travel within the annular bore 14 from a first location relative to the rotary valve 30 to a second location relative to the rotary valve 30 and a second position (see FIG. 2) to define a chamber relative to the piston 24 of the combustion piston assembly 16 at the second location.

In one arrangement, as illustrated in FIGS. 4-6, the second sealing ring 104 is configured to selectively open and isolate the fluid conduits 106 relative to the annular bore 14 during a combustion process. Of note, the annular bore 14, sequentially disposed pistons 24, fluid conduits 106, and rotary valves 30 are illustrated in linear, rather than curved, alignment for clarity.

In FIG. 4, once each piston 24-1, 24-1 has passed through the corresponding openings 100 in each rotary valve 30-1, 30-2, the rotary valves 30-1, 30-2 continue to rotate to introduce the walled structure 50 into the annular bore 14. With this positioning of the combustion piston assembly 16, the wall 27 of the second sealing ring 104 is disposed in proximity to the fluid conduits 106-1, 106-2, thereby isolating the fluid conduits 106-1, 106-2 from the annular bore 14. Additionally, motion of the pistons 24 along direction 120 pushes the exhaust generated from previous firings into exhaust channels 114-1, 114-2, thereby clearing the channels ahead. For example, rotation of the second piston 24-2 along direction 120 pushes exhaust within the annular bore 14 to exhaust channel 114-1 which, in turn, directs the exhaust to the atmosphere.

In FIG. 5, the walled structure 50 of the rotary valves 30-1, 30-2 is disposed within the annular bore 14 to form a bulkhead relative to the corresponding pistons 24-1, 24-2. Further, the combustion piston assembly 16 continues to rotate along direction 120. With this positioning of the combustion piston assembly 16, wall 27 of the second sealing ring 104 is disposed distal to the fluid conduits 106-1, 106-2 and the openings 108-1, 108-2 of the second sealing ring 104 are disposed in proximity to the fluid conduits 106-1, 106-2, thereby allowing fluid communication between the fluid conduits 106-1, 106-2 and the combustion chambers 110-1, 110-2. With the pressure within the fluid conduits 106-1, 106-2 being higher than the corresponding combustion chambers 110-1, 110-2, the fluid conduits 106-1, 106-2 can deliver either pressurized air 122-1, 122-2, such as from the pressurized air reservoir 350, or an air-fuel mixture 122-1, 122-2 into the respective combustion chambers 110-1, 110-2.

In FIG. 6, continued rotation of the combustion piston assembly 16 along direction 120 disposes the openings 108-1, 108-2 of the second sealing ring 104 in proximity to the first housing wall 15 of the engine 10 and the wall 27 of the second sealing ring 104 in proximity to the fluid conduits 106-1, 106-2, thereby isolating the fluid conduits 106-1, 106-2 from the annular bore 14. At this point, ignition of an air-fuel mixture in each combustion chamber 110-1, 110-2 starts and combustion begins. The process repeats when each piston 24-1, 24-2 passes the next subsequently located exhaust port.

As provided above, the fluid conduits 106 are configured to deliver either pressurized air, such as from a pressurized air reservoir 350, or an air-fuel mixture to respective combustion chambers 110 defined within the annular bore 14. In one arrangement, as described below, the fluid conduits 106 can also be configured to receive compressed air from the annular bore 14 generated during the combustion process and deliver the compressed air to the pressurized air reservoir 350.

Figure 7:
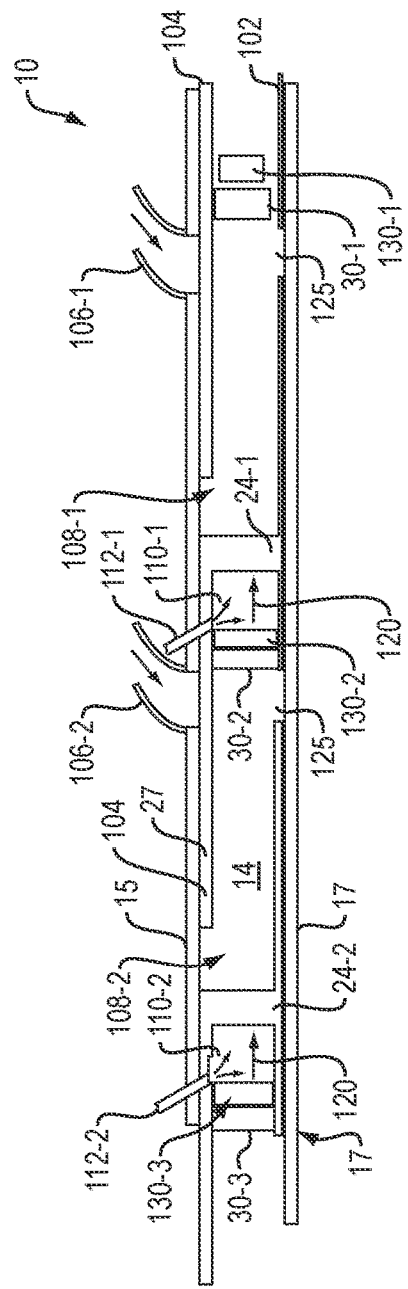
FIG. 7 illustrates a sectional, schematic view of a portion the circulating piston engine of FIG. 1A having a combustion piston assembly disposed in a first position relative to the engine's fluid conduits, according to one arrangement.

As indicated in FIG. 7, the combustion piston assembly 16 is configured to position the second sealing ring 104 in a first position to align a wall portion 27 of the second sealing ring 104 with a corresponding fluid conduit 106 to mitigate the delivery of air from the annular bore 14 to the fluid conduit 106 during compression of the air located within the annular bore 14. For example, as the pistons 24-1, 24-2 rotate within the annular bore 14 along direction 120, each piston draws air from corresponding air intake channels 130-2, 130-3 while the fuel injectors 112-1, 112-2 inject fuel into corresponding combustion chambers 110-1, 110-2. Further, rotation of the combustion piston assembly 16 disposes the openings 108-1, 108-2 of the second sealing ring 104 in proximity to the first housing wall 15 of the engine 10 and disposes the wall of the second sealing ring 104 in proximity to the fluid conduits 106-1, 106-2, thereby isolating the fluid conduits 106-1, 106-2 from the annular bore 14. As such, rotation of the pistons 24-1, 24-2 compresses the air in front of each piston against a closed rotary valve 30. For example, rotation of the first piston 24-1 compresses air against the first closed rotary valve 30-1 and rotation of the second piston 24-2 compresses air against the second closed rotary valve 30-2.

Figure 8:
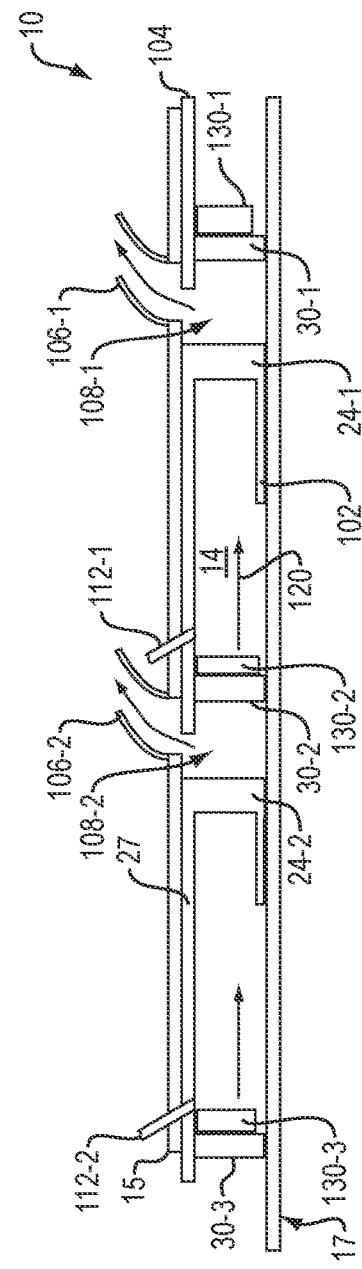
FIG. 8 illustrates the sectional, schematic view of the portion the circulating piston engine of FIG. 7 having the combustion piston assembly disposed in a second position relative to the engine's fluid conduits, according to one arrangement.

Additionally, the combustion piston assembly 16 is configured to position the second sealing ring 104 in a second position to align an opening 108 of the second sealing ring 104 with corresponding fluid conduit 106 to facilitate the flow of compressed air located within the annular bore 14 and in front of each piston 24 to flow through the fluid conduit 106. For example, during operation, compression of the air continues until the openings 108-1, 108-2 in the secondary sealing ring 104 aligns with the opening in the fluid conduits 106-1, 106-2 As indicated in FIG. 8, further rotation of the combustion piston assembly 16 disposes the openings 108-1, 108-2 of the second sealing ring 104 in proximity to the fluid conduits 106-1, 106-2 and disposes the wall of the second sealing ring 104 in proximity to the first housing wall 15. Such positioning allows fluid communication between the fluid conduits 106-1, 106-2 and the annular bore 14, thereby allowing the pressurized air to flow from the annular bore 14, through the conduits 106-1, 106-2, and to a pressurized air reservoir 350.

As provided above, both fuel combustion and air compression can take place in a single annular bore 14 defined by the engine 10. In one arrangement, the engine 10 can include separate combustion and compression channels in order to separate the compression process from the combustion process. For example, the engine 10 can be configured with an air compression assembly which includes a compression channel which can be machined or formed from a relatively light weight material. In addition, the volume of the compression channel can be larger than the volume of a corresponding combustion channel. Such a difference in volume increases the air capacity of the air compression assembly relative to the combustion assembly 25, thereby minimizing or eliminating the need for supplemental devices. In the absence of a crankshaft, connecting rods, balance weights, cam shafts, etc., this engine having an integrated air compression assembly can be 50% lighter than conventional crankshaft based engines and produces power close to 100% of the time.

Figure 9:
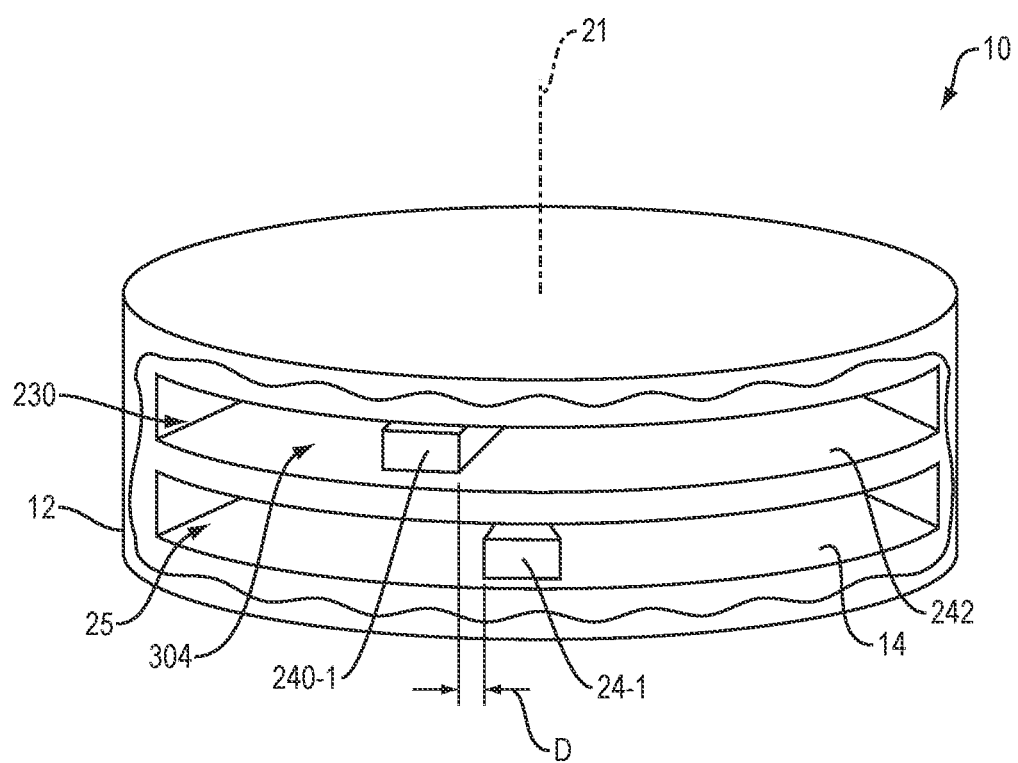
FIG. 9 illustrates a partial sectional, schematic side view of a circulating piston engine having a combustion channel and an air compression channel, according to one arrangement.

For example, FIG. 9 illustrates a partial sectional, schematic side view of a circulating piston engine 10 having the air compression assembly 230. The air compression assembly 230 is configured as a source of compressed air for the engine 10 which can be delivered to the fuel injectors 112 during operation.

In one arrangement, the air compression assembly 230 can include an annular compression channel 242 defined by the housing 12. As illustrated, the compression channel 242 can be disposed axially above, and substantially parallel to, the combustion channel (i.e., annular bore) 14 along the axis of rotation 21. The air compression assembly 230 also includes a compression piston assembly 304 disposed within the annular compression channel 242. The compression piston assembly 304 can include a set of compression pistons 240 coupled to the driveshaft (not shown) and disposed within the annular compression channel 242. Further, as indicated in FIGS. 10 and 11, the compression piston assembly 304 can include a compression piston sealing ring 204 connected to each compression piston 240. The compression piston sealing ring 204 is configured to provide selective access between the annular compression channel 242 and a compressed fluid conduit 206 carried by the engine 10, as will be described below.

Returning to FIG. 9, during operation, both sets of pistons 24, 240 rotate at substantially the same rate. As illustrated, each compression piston 240 is disposed at an offset distance D proximal to each respective piston 240. The offset distance D allows a single rotary valve 30 having a single opening 100 to serve as the rotary valve for both channels 14, 242.

During operation of the air compression assembly 230, as provided with reference to FIGS. 10 and 11, the compression piston assembly 304 is configured to dispose the compression piston sealing ring 204 in a first position to align a wall portion 227 of the compression piston sealing ring 204 with a corresponding fluid conduit 206 to mitigate the delivery of air from the annular compression channel 242 to the compressed fluid conduit 206 during compression of the air located within the annular compression channel 242. The compression piston assembly 304 is further configured to dispose the compression piston sealing ring 204 in a second position to align the opening 208 of the compression piston sealing ring 204 with the compressed fluid conduit 206 to facilitate the flow of compressed air located within the annular compression channel 242 and in front of each piston 240 to flow through the compressed fluid conduit 206.

For example, as indicated in FIG. 10, in a first position, openings 208-1, 208-2 of a compression piston sealing ring 204 are disposed in proximity to the first housing wall 15 of the engine 10 and a wall 227 of the compression piston sealing ring 204 is disposed in proximity to fluid conduits 206-1, 206-2, thereby isolating the fluid conduits 206-1, 206-2 from the annular compression channel 242. With this positioning, as the pistons 240-1, 240-2 rotate within the annular bore 242 along direction 120, the pistons 240-1, 240-2 create a vacuum relative to respective closed rotary valves 30-1, 30-2 and draw air from outside the engine 10 via intake channels 232-1, 232-2. As such, the intake channels 232-1, 232-2 fill the respective volumes 234-1, 234-2 between the pistons 240-1, 240-2 and the rotary valves 30-1, 30-2 with uncompressed air. Also with this positioning, as the pistons 240-1, 240-2 rotate within the annular bore 242 along direction 120, each of the pistons 240-1, 240-2 compress air in the chamber 236-1, 236-2 disposed ahead of it. For example, second piston 240-2 compresses air located in chamber 236-2 which was previously drawn in to the chamber 236-2 by first piston 240-1.

As indicated in FIG. 11, with motion of the pistons 240-1, 240-2 along direction 120, the pistons 240-1, 240-2 continue to compress the air in the chamber 236-1, 236-2 until the openings 208-1, 208-2 in the compression piston sealing ring 204 approach and become substantially aligned with fluid conduits 206-1, 206-2. Such positioning allows fluid communication between the fluid conduits 206-1, 206-2 and the annular bore 14. Once the openings 208-1, 208-2 align with the fluid conduits 206-1, 206-2, the compressed air contained within the chamber 236-1, 236-2 enters the fluid conduits 206-1, 206-2 and flows, for example, into a pressurized air reservoir 350.

Figure 12:
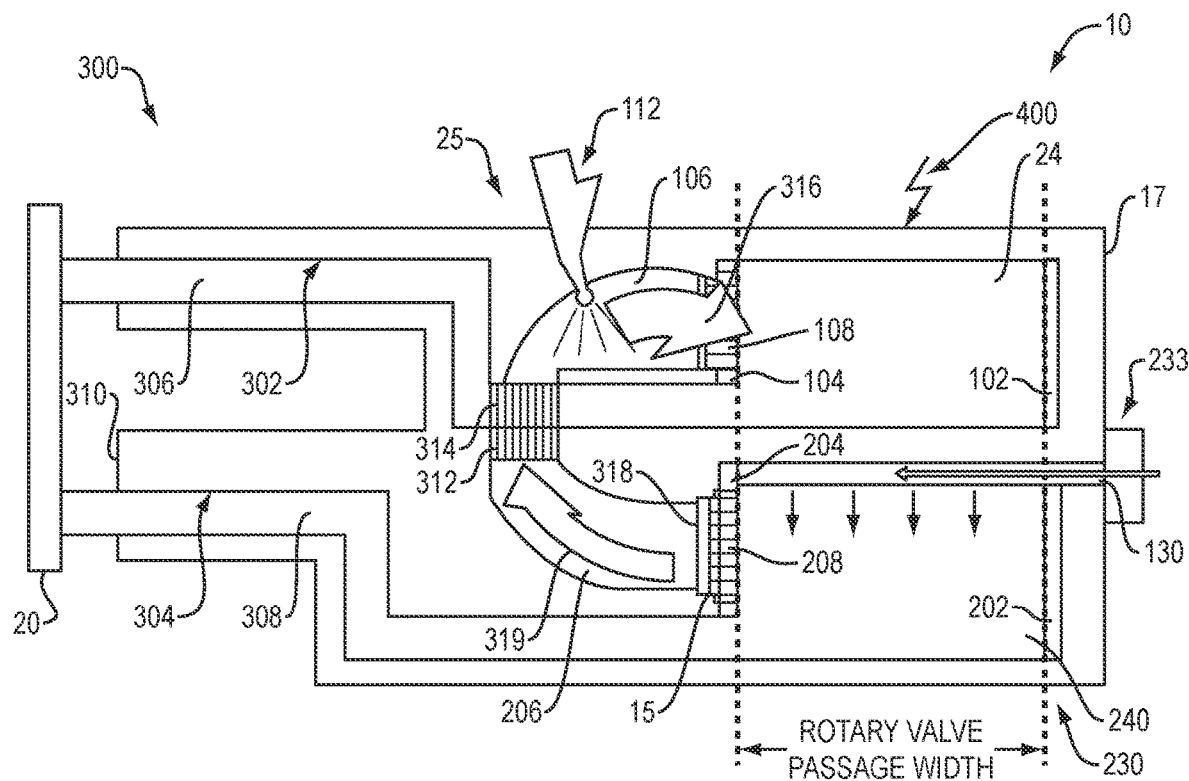
FIG. 12 illustrates a side-sectional, schematic view of an air-fuel management system, according to one arrangement.

As provided above, the fluid conduits 206-1, 206-2 are configured to provide pressurized air generated by the air compression assembly 230 to a pressurized air reservoir 350. Such description is provided by way of example only. In one arrangement, as indicated in FIG. 12, the engine 10 can include an air-fuel management system 300 configured to allow the fluid conduits 206 to direct at least a portion of the pressurized air to the fluid conduits 106 of the combustion assembly 25.

With reference to FIGS. 12, 13A, 13B, and 13C, the air-fuel management system 300 includes a base plate 310 disposed between the combustion assembly 25 and the air compression assembly 230. The base plate 310 defines an opening 312 for fluid conduit 206 of the compression assembly 230. The engine 10 also includes a combustion piston assembly 302 associated with the combustion assembly 25 and a compression piston assembly 304 associated with the compression assembly 230. For example, the combustion piston assembly 302 can include piston 24 coupled to a drive shaft 20 by an extension portion 306 while the compression piston assembly 304 can include piston 240 coupled to the drive shaft 20 by an extension portion 308. In one arrangement, the extension portion 306 of the combustion piston assembly 302 defines an opening 314 configured to be selectively aligned with the opening 312 of the base plate 310 to allow compressed air to flow from the pressurized fluid conduit 206, to the fluid conduit 106.

Figure 13A:
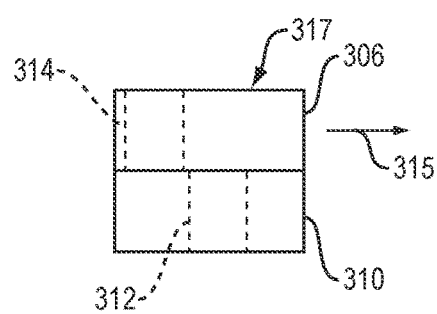
FIG. 13A illustrates a side sectional, schematic view of an opening in a combustion piston assembly disposed in a first position relative to an opening in a base plate of the air-fuel management system, according to one arrangement.
Figure 13B:
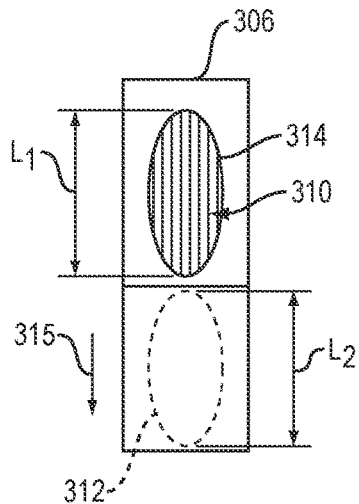
FIG. 13B illustrates a top schematic view of the air-fuel management system of FIG. 13A, according to one arrangement.

For example, the combustion piston assembly 302 is configured to position the extension portion 306 in a first position, as shown in FIGS. 13A and 13B, to align a wall portion 317 of the extension portion 306 with the opening 312 defined by the base plate 310. With the wall 317 portion blocking the opening 312, such positioning can mitigate the delivery of compressed air 319 from the compressed fluid conduit 206 of the compression assembly 230 to the fluid conduit 106 of the combustion assembly 25.

Figure 13C:
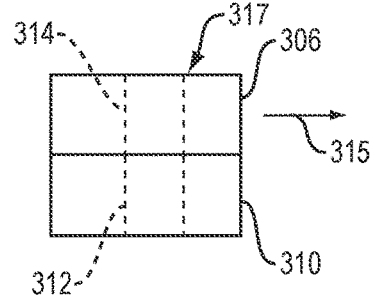
FIG. 13C illustrates a side sectional, schematic view of the opening in the combustion piston assembly disposed in a second position relative to the opening in the base plate of the air-fuel management system, according to one arrangement.

During further operation, the combustion piston assembly 302 is configured to position the extension portion 306 in a second position, as indicated in FIG. 13C, to align the opening 314 of the extension portion 306 with the opening 312 defined by the base plate 310 to facilitate the flow of compressed air 319 from the at least one compressed fluid conduit 206 of the compression assembly 230 to the fluid conduit 106 of the combustion assembly 25. For example, as indicated in FIGS. 13B and 13C, rotation of the extension portion 306 along direction 315 causes gradual alignment between the opening 314 of the extension portion 306 and the opening 312 in the base plate 310 which, in turn, the controls the timing and duration of pressurized air delivery to the combustion assembly 25. Accordingly, in the presence of an overlap between the opening 314 of the extension portion 306 and the opening 312 in the base plate 310, pressurized air can travel into fluid conduit 106.

In one arrangement, the relative geometries of the openings 312, 314 can define the duration of the delivery of pressurized air from the compressed fluid conduit 206 to the fluid conduit 106 of the combustion assembly 25. For example, as illustrated, each opening 314, 312 is configured with a substantially ovular shape, each oval shape having a major axis with a corresponding length $L_1$, $L_2$. During operation, as the extension portion 306 rotates past the base plate 310, overlap of the openings 314, 312 along lengths $L_1$, $L_2$ defines the duration of the flow of pressurized air from the pressurized fluid conduit 206 to the fluid conduit 106. For example, in the case where $L_1=L_2$, the total duration of time for the delivery of pressurized air from the pressurized fluid conduit 206 to the fluid conduit is 2 L (i.e., the amount of time that it takes $L_1$ to pass over $L_2$).

As provided above, the air-fuel management system 300 can utilize selective alignment of the opening 314 defined by the extension portion 306 of the combustion piston assembly 302 with the opening 312 defined by the base plate 310 to control the flow of pressurized air from the pressurized fluid conduit 206 to the fluid conduit 106. In one arrangement, returning to FIG. 12, the base plate 310 can include an air control valve (not shown) disposed between the opening 312 and the pressurized fluid conduit 206. With such a configuration, the air control valve can be configured to open in response to the pressurized fluid conduit 206 reaching a particular air pressure. As such, the air control valve can act as a throttle for delivery of the pressurized air from the pressurized fluid conduit 206 to the fluid conduit 106.

In one arrangement, the air-fuel management system 300 can also include stationary valves to further control the flow of pressurized air between the compression piston assembly 304 and the combustion piston assembly 302. For example, the combustion piston assembly 302 can include a stationary valve 316 disposed in proximity to the inner sealing ring 104 and the compression piston assembly 304 can include a stationary valve 318 disposed in proximity to the compression piston sealing ring 204. The sealing rings 104, 204 are configured to rotate relative to the stationary valves 316, 318.

During operation, rotation of the sealing rings 104, 204 causes gradual alignment and non-alignment between the openings 108, 208 defined by the inner sealing rings 104, 204 and the respective stationary valves 316, 318. As the opening 208 defined by the sealing ring 204 becomes aligned with the stationary valve 318, pressurized air can flow from the compression assembly 230 to the compressed fluid conduit 206. Further, as the opening 108 defined by the inner sealing ring 104 becomes aligned with the stationary valve 316, pressurized air can flow from the fluid conduit 106 to the combustion assembly 25. Interaction between the openings 108, 208 and the stationary valves 316, 318 provides the timing and duration for the flow of the compressed air from the compression assembly 230 to the fluid conduit 206 and from the fluid conduit 106 and into the combustion assembly 25.

In one arrangement, the speed of the rotation of the combustion piston assembly 302 is controlled by the number of firings per revolution. For example, the speed of the rotation of the combustion piston assembly 302 can be determined by the firing order of the fuel injectors 112. The four fuel injectors 112 of a four piston engine can fire 16 times per revolution for full power. Alternately, the engine 10 can fire the fuel injectors any number between 1 and 16 times per revolution to provide 16 speed settings. Combustion chambers in the combustion assembly 25 can be prevented from firing by disabling the appropriate injectors 112 and closing air intake valves 233 associated with the air intake channels 130 of the compression assembly 230 to mitigate compression of unneeded air. Further, to achieve speed management, the fuel injector 112 can be disposed in the volume just in front of the entrance to the combustion chamber of the combustion assembly 25.

Figure 14:
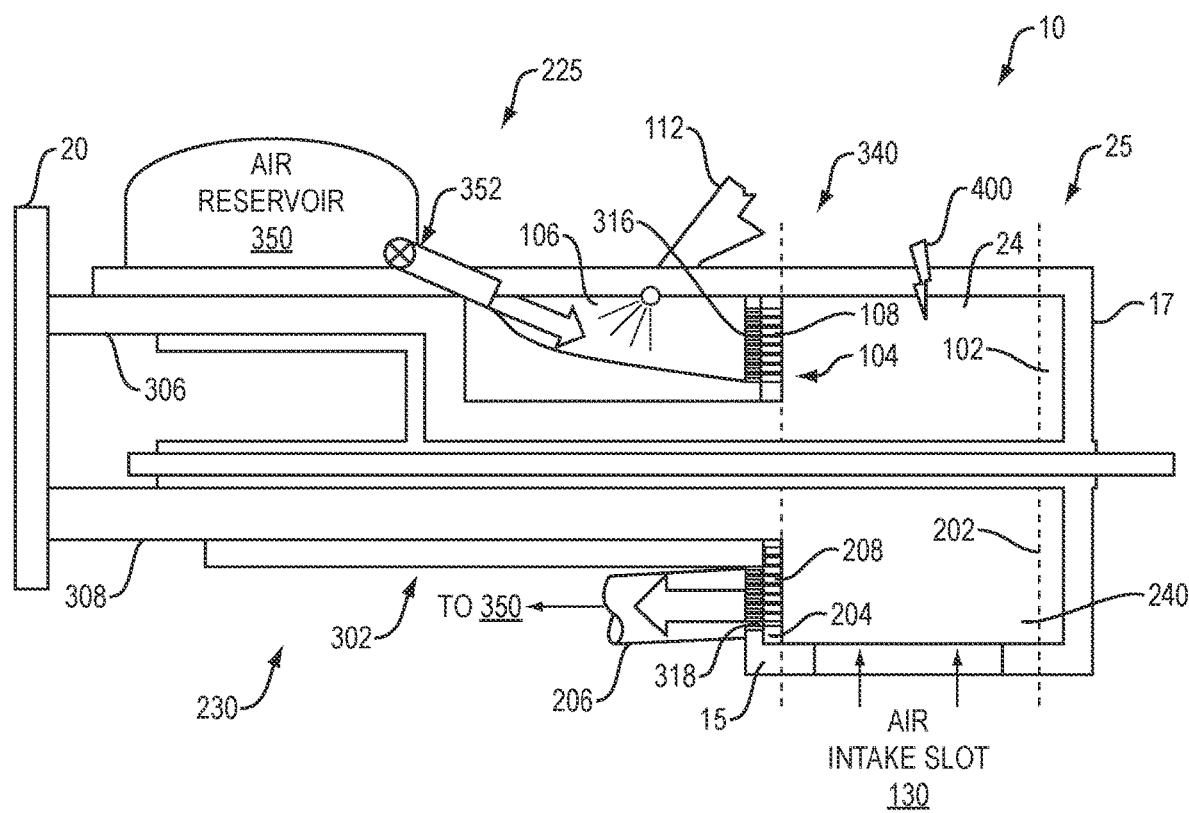
FIG. 14 illustrates a side-sectional, schematic view of an air fuel management system, according to one arrangement.
Figure 15:
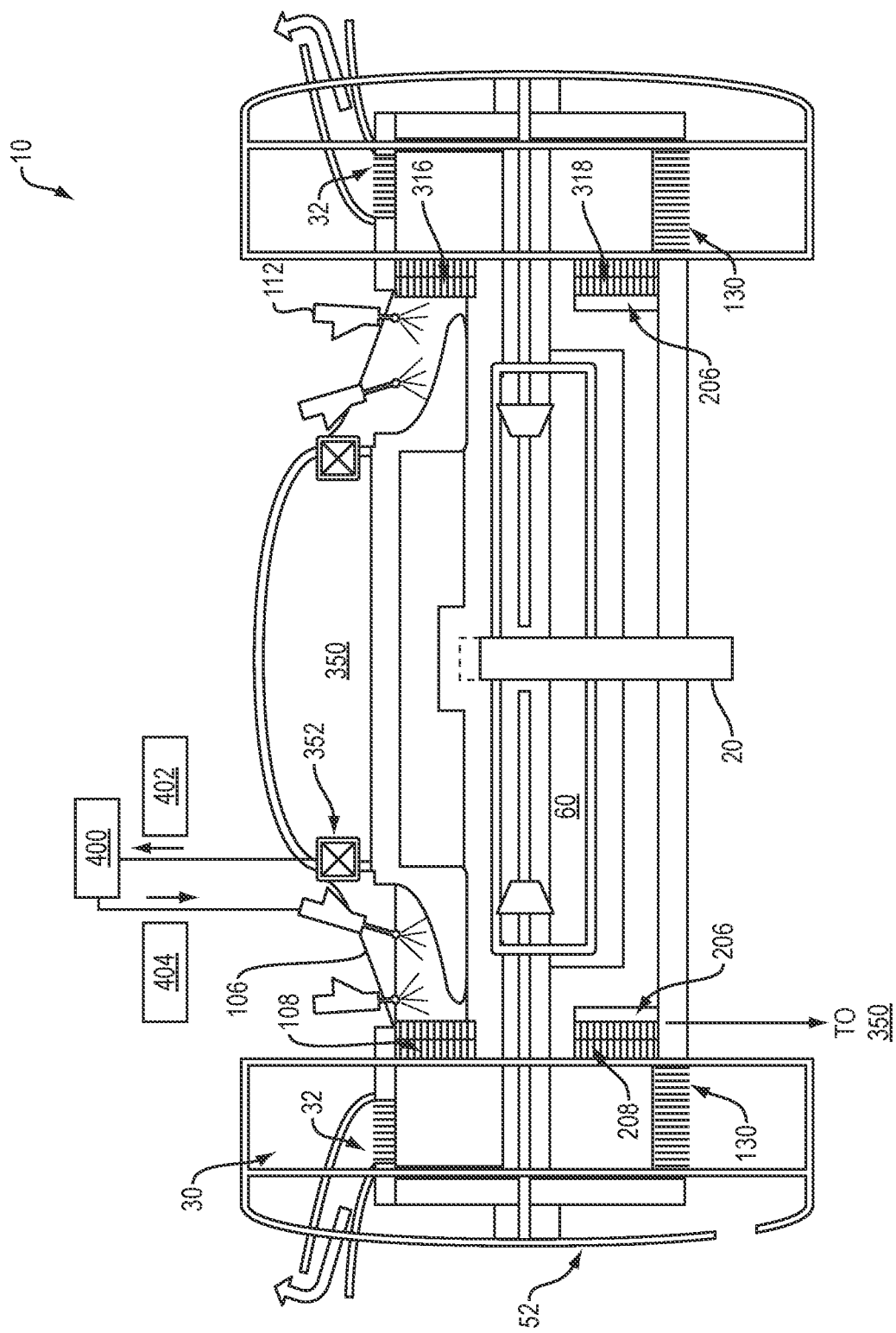
FIG. 15 illustrates a side-sectional, schematic view of an air fuel management system, according to one arrangement.

In one arrangement, as illustrated in FIGS. 14 and 15, the engine 10 includes an air-fuel management system 340 configured to allow the pressurized fluid conduit 206 to direct the pressurized air generated by the compression assembly 230 to an air reservoir 350. Such an arrangement provides the air-fuel management system 340 with control over the process of mixing air and fuel, as well as management of an engine starting procedure.

For example, the combustion piston assembly 302 includes a stationary valve 316 disposed in proximity to the inner sealing ring 104 and the compression piston assembly 304 includes a stationary valve 318 disposed in proximity to the sealing ring 204. The sealing rings 104, 204 are configured to rotate relative to the stationary valves 316, 318. During operation, rotation of the sealing rings 104, 204 causes gradual alignment and non-alignment with the openings 108, 208 defined by the sealing rings 104, 204 and the respective stationary valves 316, 318. For example, with respect to compression piston sealing ring 204, as the opening 208 becomes aligned with the stationary valve 318, compressed air generated by the compression assembly 230 exits the compression assembly 230 via the fluid conduit 206 which, in turn, directs the pressurized air to the air reservoir 350 for storage. With respect to compression piston sealing ring 104, as the opening 108 becomes aligned with the stationary valve 316, air-fuel management system 340 can open an air control valve 352 disposed between the pressurized air reservoir 350 and the fluid conduit 106 to introduce pressurized air from the air reservoir 350 into the fluid conduit 106. Further, activation of the fuel injector 112 provides fuel to the fluid conduit 106. Further rotation of the compression piston sealing ring 104 relative to the stationary valve 316 further aligns the opening 108 with the stationary valve 316 which, in turn, allows the pressurized air and fuel mixture within the fluid conduit 106 to enter a combustion chamber defined by the combustion assembly 25.

In one arrangement, the pressurized air reservoir 350 is configured to store a volume of pressurized air for use in starting the engine 10. For example, prior to an engine ignition, the pistons 24 of the engine 10 are disposed in a non-rotating state. However, the combustion assembly 25 is configured to provide air and fuel to the combustion chamber once the pistons 24 have started to rotate within the engine 10. During an engine ignition process, the air reservoir 350 delivers air to the piston assembly 25 in order to initiate the rotation of the pistons 24 within the engine 10. Following rotation the engine 10 can fire one or more fuel injectors 112 along with corresponding spark plugs or glow plugs 400 to ignite the air-fuel mix to continue the rotation of the pistons 24. Accordingly, the use of the pressurized air reservoir 350 to start the engine mitigates the need for a battery as part of the ignition process.

In one arrangement, with continued reference to FIG. 15, the engine 10 includes a feedback control system 400 disposed in electrical communication between each fuel injector 112 and corresponding air control valve 352 associated with the pressurized air reservoir 350. The feedback control system 400 is configured to adjust the operation of the fuel injector 112 in proportion to a setting on the air control valve 352. For example, during operation, a user can adjust the air control valve 352 using a throttle controller to control the speed of the engine 10. With such adjustment, the air control valve 352 can provide a valve position signal 402 to the feedback control system 400. In order to maintain a proportionate operation of the fuel injector 112, the feedback control system 400 can generate a fuel injector operation signal 404 based upon the valve position signal 402 and can transmit the fuel injector operation signal 404 to the fuel injector 112. The fuel injector operation signal 404, in turn, causes the fuel injector 112 to adjust the volume of fuel delivered to the fluid channel 106. As such, the volume of fuel provided by the fuel injector 112 is proportionate to the volume of air provided to the fluid channel 106.

During operation, the engine 10 can utilize an air-fuel mixture ignition device, such as a spark plug or a glow plug, to ignite an air-fuel mixture within a combustion chamber. In one arrangement, the engine 10 is configured with a combustion control system to provide relatively precise ignition control of the air-fuel mixture ignition device. Such control can mitigate the probability of the air-fuel mixture within the combustion chamber quenching the ignition device.

Figure 16A:
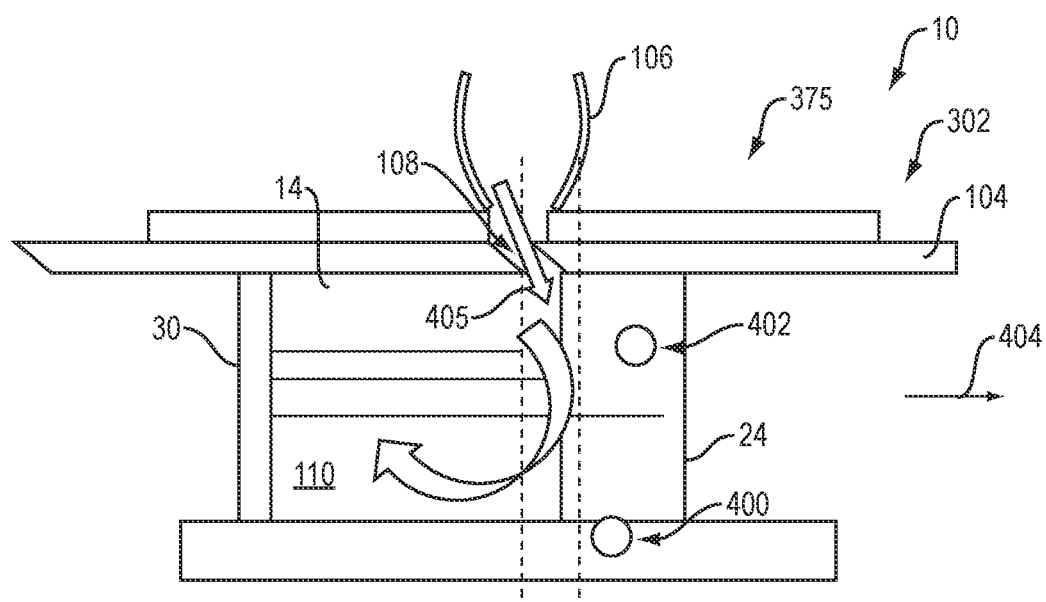
FIG. 16A illustrates a side-sectional, schematic view of a combustion control system disposed in a first position, according to one arrangement.

With reference to FIG. 16A, the combustion control system 375 includes a first air-fuel mixture ignition device 400 disposed at a first location relative to a fluid conduit 106 and a second ignition device 402 disposed at a second position 402 relative to the fluid conduit 106. As illustrated, the second ignition device 402 is disposed at a distal position relative to the first ignition device 400. The piston 24 forms part of the combustion control system 375 and is configured to sequentially uncover the first and second ignition devices 400, 402 to selectively control operation of the devices 400, 402.

In one arrangement, during operation, the combustion piston assembly 302 is configured to position the piston 24 in a first position to align the piston with a corresponding ignition device 400, 402 to mitigate ignition of an air-fuel mixture 405 within the combustion chamber 110. For example, as illustrated, the combustion piston assembly 302 disposes the piston 24 in proximity to both ignition devices 400, 402 to cover the devices 400, 402. The combustion piston assembly 302 further aligns the opening 108 of the sealing ring 104 with the fluid conduit 106 to allow the fluid conduit 106 to introduce an air-fuel mixture 405 into the combustion chamber 110 of the engine 10 between the rotary valve 30 and the piston. As illustrated, the opening 108 is angled relative to the sealing ring and fluid conduit 106 such that the fluid conduit 106 directs the air-fuel mixture 405 into the combustion chamber 110 with a circular motion. Such circular motion can create turbulence within the combustion chamber 110 to allow relatively rapid combustion of the air-fuel mixture 405.

Figure 16B:
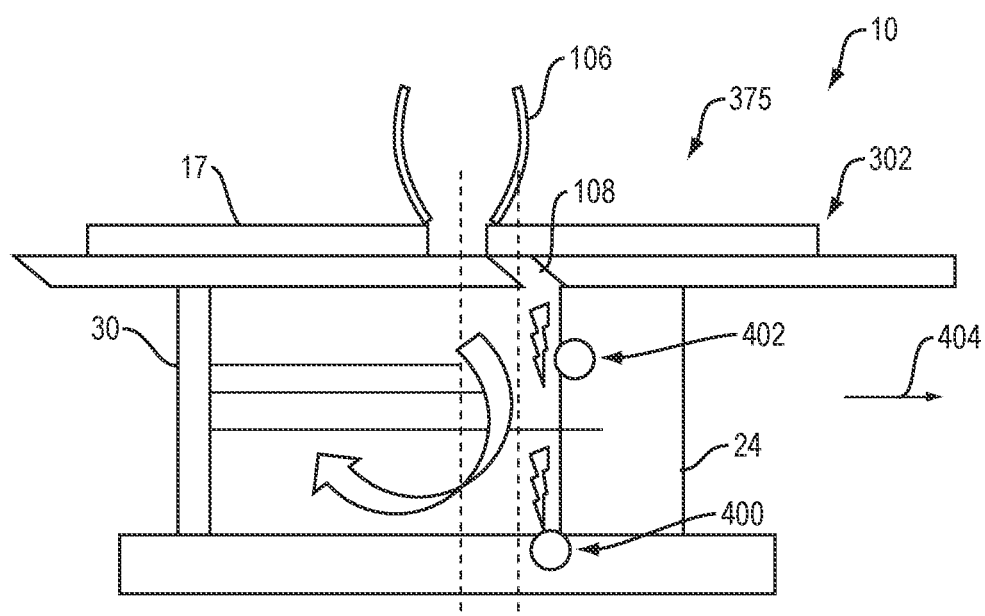
FIG. 16B illustrates the side-sectional, schematic view of the combustion control system of FIG. 16A disposed in a second position, according to one arrangement.

With reference to FIG. 16B, the combustion piston assembly 302 is further configured to position the piston 24 in a second position to misalign the piston 24 relative to the ignition devices to promote ignition of the air-fuel mixture 405 within the combustion chamber 110. For example, as illustrated, the combustion piston assembly 302 disposes the opening 108 of the sealing ring 104 against the engine wall 17 along direction 404 to close the fluid conduit 106. The combustion piston assembly 302 further disposed the piston 24 along direction 404 in proximity to both ignition devices 400, 402 to uncover the devices 400, 402 in a sequential manner which promotes ignition of the air-fuel mixture 105 at several points within the combustion chamber 110.

While various embodiments of the innovation have been particularly shown and described, it will be understood by those skilled in the art that various changes in form and details may be made therein without departing from the spirit and scope of the innovation as defined by the appended claims.

What is claimed is:

1. An engine, comprising:
   a housing;
   a combustion assembly carried by the housing, the combustion assembly comprising:
   an annular bore defined by the engine, and
   a combustion piston assembly disposed within the annular bore, the combustion piston assembly comprising:
   a set of pistons;
   a sealing ring connected to each piston of the set of pistons, the sealing ring configured to provide selective access between the annular bore and at least one fluid conduit carried by the engine; and
   at least one valve configured to move within the annular bore between a first position to define a travel path for at least one piston of the set of pistons and a second position to define a combustion chamber relative to the at least one piston of the set of pistons;
   wherein the at least one valve comprises at least one rotary valve having a circular faceplate and a wall structure disposed at an outer periphery of the faceplate, a portion of the at least one rotary valve disposed within the annular bore such that the axis of rotation of the wall structure is substantially perpendicular to an axis of rotation of a piston of the combustion piston assembly.

2. The engine of claim 1, further comprising a rotary drive mechanism connected to the at least one rotary valve and configured to rotate the at least one rotary valve between a first position to align an opening of the wall structure with the annular bore to allow the piston of the combustion piston assembly to travel within the annular bore from a first location relative to the rotary valve to a second location relative to the rotary valve and a second position to define a chamber relative to the piston of the combustion piston assembly at the second location.

3. The engine of claim 1, further comprising a fuel injector configured to provide fuel to the at least one fluid conduit, the at least one fluid conduit configured to receive air from an air source.

4. The engine of claim 1, wherein:
   the sealing ring defines at least one opening; and
   the combustion piston assembly is configured to position the sealing ring between:
   a first position to align a wall portion of the sealing ring with the at least one fluid conduit to mitigate the flow of an air-fuel mixture from the at least one fluid conduit into the combustion chamber, and
   a second position to align the at least one opening of the sealing ring with the at least one fluid conduit to facilitate the flow of an air-fuel mixture from the at least one fluid conduit into the combustion chamber.

5. The engine of claim 1, wherein:
   the sealing ring defines at least one opening; and
   the combustion piston assembly is configured to position the sealing ring between:
   a first position to align a wall portion of the sealing ring with the at least one fluid conduit to mitigate the delivery of air from the annular bore to the at least one fluid conduit during compression of the air located within the annular bore, and
   a second position to align the at least one opening of the sealing ring with the at least one fluid conduit to facilitate the flow of compressed air located within the annular bore and in front of each piston to flow through the at least one fluid conduit.

6. The engine of claim 1, further comprising an ignition device disposed in proximity to the at least one fluid conduit carried by the engine, wherein the combustion piston assembly is configured to position each piston of the set of pistons between:
   a first position to align each piston of the set of pistons with the corresponding ignition device to mitigate ignition of an air-fuel mixture within the combustion chamber; and
   a second position to misalign each piston of the set of pistons with the corresponding ignition device to promote ignition of the air-fuel mixture within the combustion chamber.

7. The engine of claim 1, further comprising a compression assembly carried by the engine, the compression assembly comprising:
   an annular compression channel defined by the housing, the annular compression channel disposed substantially parallel to the annular bore defined by the housing; and
   a compression piston assembly disposed within the annular compression channel, the compression piston assembly comprising:
   a set of compression pistons disposed within the annular compression channel, and
   a compression piston sealing ring connected to each compression piston of the set of compression pistons, the compression piston sealing ring configured to provide selective access between the annular compression channel and at least one compressed fluid conduit carried by the engine.

8. The engine of claim 7, wherein:
the compression piston sealing ring defines at least one opening; and
the compression piston assembly is configured to position the compression piston sealing ring between:
   a first position to align a wall portion of the compression piston sealing ring with the at least one fluid conduit to mitigate the delivery of air from the annular compression channel to the at least one compressed fluid conduit during compression of the air located within the annular compression channel, and
   a second position to align the at least one opening of the compression piston sealing ring with the at least one compressed fluid conduit to facilitate the flow of compressed air located within the annular compression channel and in front of each piston to flow through the at least one compressed fluid conduit.

9. The engine of claim 7, comprising:
a base plate disposed between the compression assembly and the combustion assembly, the base plate defining an opening disposed between the at least one compressed fluid conduit of the compression assembly and the at least one fluid conduit of the combustion assembly; and
wherein the combustion piston assembly comprises an extension portion disposed between the combustion piston and a drive shaft of the engine, the extension portion defining an opening configured to be selectively aligned with the opening defined by the base plate to facilitate flow of compressed air from the at least one compressed fluid conduit to the at least one fluid conduit of the combustion assembly.

10. The engine of claim 9, wherein the combustion piston assembly is configured to position the extension portion between:
   a first position to align a wall portion of the extension portion with the opening defined by the base plate to mitigate the delivery of compressed air from the at least one compressed fluid conduit of the compression assembly and the at least one fluid conduit of the combustion assembly; and
   a second position to align the opening of extension portion with the opening defined by the base plate to facilitate the flow of compressed air from the at least one compressed fluid conduit of the compression assembly and the at least one fluid conduit of the combustion assembly.

11. The engine of claim 7, further comprising an air reservoir disposed in fluid communication with the compression assembly, the air reservoir configured to receive compressed air from the at least one compressed fluid conduit.

12. The engine of claim 11, wherein the air reservoir is disposed in fluid communication with the at least one fluid conduit of the combustion assembly.

13. The engine of claim 12 further comprising an air control valve disposed in fluid communication between the air reservoir and the at least one fluid conduit of the combustion assembly.

14. The engine of claim 13, further comprising a feedback control system disposed between the air control valve and a fuel injector of the engine, the feedback control system configured to adjust the operation of the fuel injector in proportion to an air control valve setting.

15. An engine, comprising:
a housing;
a combustion assembly carried by the housing, the combustion assembly comprising:
   an annular bore defined by the engine, and
   a combustion piston assembly disposed within the annular bore, the combustion piston assembly comprising:
      a set of pistons;
      a sealing ring connected to each piston of the set of pistons, the sealing ring configured to provide selective access between the annular bore and at least one fluid conduit carried by the engine;
at least one valve configured to move within the annular bore between a first position to define a travel path for at least one piston of the set of pistons and a second position to define a combustion chamber relative to the at least one piston of the set of pistons; and
a compression assembly carried by the engine, the compression assembly comprising:
   an annular compression channel defined by the housing, the annular compression channel disposed substantially parallel to the annular bore defined by the housing; and
   a compression piston assembly disposed within the annular compression channel, the compression piston assembly comprising:
      a set of compression pistons disposed within the annular compression channel, and
      a compression piston sealing ring connected to each compression piston of the set of compression pistons, the compression piston sealing ring configured to provide selective access between the annular compression channel and at least one compressed fluid conduit carried by the engine.

16. The engine of claim 15, wherein:
the compression piston sealing ring defines at least one opening; and
the compression piston assembly is configured to position the compression piston sealing ring between:
   a first position to align a wall portion of the compression piston sealing ring with the at least one fluid conduit to mitigate the delivery of air from the annular compression channel to the at least one compressed fluid conduit during compression of the air located within the annular compression channel, and
   a second position to align the at least one opening of the compression piston sealing ring with the at least one compressed fluid conduit to facilitate the flow of compressed air located within the annular compression channel and in front of each piston to flow through the at least one compressed fluid conduit.

17. The engine of claim 15, comprising:
a base plate disposed between the compression assembly and the combustion assembly, the base plate defining an opening disposed between the at least one compressed fluid conduit of the compression assembly and the at least one fluid conduit of the combustion assembly; and
wherein the combustion piston assembly comprises an extension portion disposed between the combustion piston and a drive shaft of the engine, the extension portion defining an opening configured to be selectively aligned with the opening defined by the base plate to facilitate flow of compressed air from the at least one compressed fluid conduit to the at least one fluid conduit of the combustion assembly.

18. The engine of claim 17, wherein the combustion piston assembly is configured to position the extension portion between:
- a first position to align a wall portion of the extension portion with the opening defined by the base plate to mitigate the delivery of compressed air from the at least one compressed fluid conduit of the compression assembly and the at least one fluid conduit of the combustion assembly; and
- a second position to align the opening of extension portion with the opening defined by the base plate to facilitate the flow of compressed air from the at least one compressed fluid conduit of the compression assembly and the at least one fluid conduit of the combustion assembly.

19. The engine of claim 15, further comprising an air reservoir disposed in fluid communication with the compression assembly, the air reservoir configured to receive compressed air from the at least one compressed fluid conduit.

20. The engine of claim 19, wherein the air reservoir is disposed in fluid communication with the at least one fluid conduit of the combustion assembly.

21. The engine of claim 20 further comprising an air control valve disposed in fluid communication between the air reservoir and the at least one fluid conduit of the combustion assembly.

22. The engine of claim 21, further comprising a feedback control system disposed between the air control valve and a fuel injector of the engine, the feedback control system configured to adjust the operation of the fuel injector in proportion to an air control valve setting.

\* \* \* \* \*